United States Patent [19]

Richard

[11] Patent Number: 4,612,292

[45] Date of Patent: Sep. 16, 1986

[54] LEAD/ALKALINE EARTH METAL SILICATES AND VITRESCIBLE COMPOSITIONS COMPRISED THEREOF

[75] Inventor: Christian Richard, Clamecy, France

[73] Assignee: Rhone-Poulenc Industries, Paris, France

[21] Appl. No.: 456,814

[22] Filed: Jan. 10, 1983

Related U.S. Application Data

[63] Continuation of Ser. No. 125,212, Feb. 27, 1980, abandoned, which is a continuation of Ser. No. 123,849, Feb. 22, 1980, abandoned.

[30] Foreign Application Priority Data

Feb. 22, 1979 [FR] France ............................... 79 04536
Jun. 6, 1979 [FR] France ............................... 79 14408
Sep. 18, 1979 [FR] France ............................... 79 23176

[51] Int. Cl.$^4$ ............................................... C03C 3/102
[52] U.S. Cl. ........................................ 501/27; 65/134; 423/326; 501/60; 501/65; 501/70
[58] Field of Search .............. 65/134; 501/37, 29, 501/60, 72, 22; 423/326, 331, 92

[56] References Cited

U.S. PATENT DOCUMENTS

| | | | |
|---|---|---|---|
| 2,007,349 | 7/1935 | Schertel | 501/60 |
| 2,033,103 | 3/1936 | Beyersdorfer | 501/22 |
| 2,088,281 | 7/1937 | Smith | 423/326 |
| 2,194,629 | 3/1940 | Addison | 106/297 X |
| 2,934,443 | 4/1960 | Shell et al. | 106/297 |
| 2,958,578 | 11/1960 | Baker | 423/326 |
| 2,978,340 | 4/1961 | Veatch et al. | 501/39 |
| 3,264,130 | 8/1966 | Mays | 106/292 |
| 3,498,807 | 3/1970 | Gresham | 106/74 |
| 3,827,893 | 8/1974 | Meissner et al. | 501/80 |
| 3,941,574 | 3/1976 | Melkonian et al. | 501/27 |
| 4,015,996 | 4/1977 | Wason | 106/288 |
| 4,029,736 | 6/1977 | Melkonian | 423/326 |
| 4,054,459 | 10/1977 | Melkonian | 501/29 |
| 4,220,461 | 9/1980 | Samanta | 501/11 |
| 4,503,158 | 3/1985 | Richard | 501/29 |

FOREIGN PATENT DOCUMENTS

| | | | |
|---|---|---|---|
| 675008 | 11/1963 | Canada | 106/306 |
| 1136678 | 9/1962 | Fed. Rep. of Germany | 106/306 |
| 1187368 | 3/1959 | France | |
| 1338872 | 8/1963 | France | 423/226 |
| 2281902 | 3/1976 | France | |
| 2504110 | 10/1982 | France | 423/326 |
| 49-35412 | 4/1974 | Japan | 501/37 |
| 383186 | 11/1932 | United Kingdom | 501/60 |
| 512292 | 8/1939 | United Kingdom | |
| 848296 | 9/1960 | United Kingdom | 501/37 |
| 855014 | 11/1960 | United Kingdom | 423/331 |

OTHER PUBLICATIONS

Condensed Chemical Dictionary-8th ed., (1971), pub. by van Nostrand, NYC, p. 510.
Chem. Abstracts, 52, p. 145, item g (1958).
Richard, C., "New Composition Based on Lead Silicate and Alkaline Silicates", Verres Refract., 33 (6) Nov.--Dec. 1979, pp. 864-865.

*Primary Examiner*—Helen M. McCarthy
*Attorney, Agent, or Firm*—Burns, Doane, Swecker & Mathis

[57] ABSTRACT

$SiO_2$/MeO metallic silicates, wherein Me is lead or an alkaline earth metal, have a molar ratio of $SiO_2$ to MeO of greater than 2, and same are well suited as pigments, fillers, and especially as glass-formers.

18 Claims, No Drawings

LEAD/ALKALINE EARTH METAL SILICATES AND VITRESCIBLE COMPOSITIONS COMPRISED THEREOF

CROSS-REFERENCE TO RELATED APPLICATIONS

This application is a continuation application of application Ser. No. 125,212, filed Feb. 27, 1980, now abandoned, which is a continuation application of application Ser. No. 123,849, filed Feb. 22, 1980, now abandoned.

BACKGROUND OF THE INVENTION

1. Field of the Invention

The present invention relates to improved siliceous glass-forming systems, the compositions therefor being high in silicon content, and, more especially, to such compositions comprising the lead or alkaline earth metal silicates. The invention also relates to the preparation of such vitrescible siliceous/silicate compositions and to the manufacture of glass therefrom.

2. Description of the Prior Art

It is well known to this art that many different materials are useful for the manufacture of glass. Silicon, boron aluminum and phosphorus, in oxide form, are the conventional elements of the three-dimensional, random glass network, or lattice. The respective amounts of such components in the glass are ofttimes limited by the difficulties encountered in obtaining fusion, fining and homogenization under acceptable conditions.

Fluxes, to lower melting and working temperatures, are also common, e.g., the oxide forms of lithium, sodium and potassium, etc. However, such additives impart unsatisfactory properties vis-a-vis the intended applications of the glasses shaped from compositions comprising the same. It too is necessary to add other oxides to improve certain properties: for example, chemical resistance is enhanced by calcium oxide, the index of refraction by barium or lead, while zinc oxide adds brilliance.

Also, various other oxides are added to the glass formers for a wide variety of purposes. The oxides of arsenic, antimony, cerium and other rare earths, for example, facilitate the fining operation. Salts, such as nitrates and sulfates, are introduced for oxidation. The addition of heavy metals enables coloring. All of the components of the glass-forming system are typically introduced in a variety of forms. Silicon comes from sand, the fluxes are typically carbonates, and the others are often found in their natural state.

The glass-forming system may thus be characterized as a purely physical admixture of ingredients, the physical state of each ingredient being dictated primarily by economics.

The various components are typically formulated from suitable admixtures.

In the case of a pure silicon glass, quartz may be used, but the temperature required for fusion thereof, which is on the order of 1800° C., presents certain, truly vexing production problems.

Thus, in most cases, sand is employed as the starting material, to which mineral compounds are added in specific instances, such as feldspar, sodium carbonate and sulfate, limestone and dolomite, minium, sodium borate, etc.

The mixture is malaxated and gradually heated to a temperature conventionally on the order of 1500° C., thus effecting melting or fusion, and a combination of the several ingredients, to form the glass. Because the molten mass contains many bubbles, an operation deemed fining is effected to eliminate the bubbles and the glass is then brought to a temperature imparting a particular viscosity thereto compatible with the actual forming operation. This is the heat-conditioning stage.

Numerous references relate to the fusion of vitrifiable admixtures. It has even been proposed to subject the materials to a preheating step prior to the actual melting [see French Patent No. 2,281,902], but to date little effort has been devoted to modifying the compositional nature, per se, of the glass-forming system.

It too is known to this art that the term "lead silicate" is intended to circumscribe many compounds of different chemical compositions and varying in their ratio $SiO_2/PbO$.

And even though these salts have long been studied, in reality only the lesser molar ratios, $SiO_2/PbO$, have seriously been investigated.

Thus, several basic lead silicates were especially noted by Mostowitsch in *Métallurgie Halle*, 4, pp. 649–53 (1907), as reported by Louis Cloutier, *Annales de Chimie*, 19, p. 41 (1933). But these silicates were obtained simply by melting varying admixtures of PbO and $SiO_2$.

In the aforementioned reference, Cloutier describes a method of obtaining the silicates by precipitation from a solution of lead nitrate and the silicate, $SiO_3Na_2$. But the only definite compound said to be obtained corresponded to the formula $3PbO.2SiO_2$, with the other silicates being considered as particular mixtures rather than as well-defined compounds. However, it has since been reported that it is possible to obtain a silicate close in composition to $PbO.2SiO_2$, by precipitation from solutions of Na silicate and a 20% solution of $Pb(NO_3)_2$[*Chemical Abstracts*, 52 p. 145g (1958)], but according to this process an excess of the lead salt induces the growth of $Pb(OH)NO_3$ crystals.

Further, a process to prepare lead silicate from a solution of lead acetate and silicate too is quite old to the art; compare U.S. Pat. No. 1,895,910. Such a product is specified as a filler for an elastomer composition. Nonetheless, it will be appreciated that in the immediately aforesaid citations the silicates reported have low molar ratios of $SiO_2$ to PbO, less than two.

In French Patent No. 1,187,368, it is mentioned that it is possible to prepare a pigment having 0.75 to 7.5 $SiO_2$ molecules per PbO molecule, but such product is a pigment composed of lead phosphate and lead silicate containing PbO, $P_2O_5$ and $SiO_2$ in the form of a physicochemical combination.

It is also known that sodium silicate, in particular, displays an increase in molecular weight in aqueous solution when the $SiO_2/Na_2O$ ratio is increased, which makes it difficult to predict the effect of the initial solution on the final product.

SUMMARY OF THE INVENTION

It has now unexpectedly been discovered that it is possible to obtain, in facile manner, a metallic silicate having a high silica content, which silicate exhibits markedly improved properties, e.g., in glass manufacture.

Thus, a major object of the invention is the provision of a metallic silicate characterized by a $SiO_2/MeO$ ratio of greater than two, and advantageously between 3 and 5. The symbol Me connotes, most preferably, Pb, or same is otherwise an alkaline earth metal, such as calcium, barium or zinc.

Another object of the invention is the provision of a lead silicate which is substantially both isotropic and amorphous.

Yet another object of the invention is the provision of a lead silicate which is essentially insoluble in boiling water and displays but low ignition loss at 900° C., which, for all intents and purposes, is already commencing at 500° C., and all of which evidences that the product is a well defined compound and different from a simple composition, or uncombined admixture, comprising lead oxide and silica.

Another object of the invention is the provision of a metallic silicate essentially devoid of metallic impurities.

Still another object of the invention is the provision of a lead silicate, the actual density of which is low in relation to the lead oxides.

Briefly, the present invention features the solubilization of silica by reacting a solution of a soluble alkali metal silicate and a solution of a soluble salt of the metal, the silicate of which is sought to be prepared, and replacement with such metal of at least a portion of the alkali metal oxide fraction comprising the starting material silicate. As hereinbefore mentioned, the "metal" is either lead or an alkaline earth metal, i.e., a metal having a valence of at least two, and which, most preferably, is lead.

DETAILED DESCRIPTION OF THE INVENTION

More particulary, in the case of the preferred lead, a solution of a soluble alkali metal silicate and a solution of a soluble salt of lead ("substitution" metal) are interreacted, utilizing a stoichiometric excess of the lead salt.

According to one preferred embodiment of the invention, a stoichiometric excess of the lead salt with respect to the amount of silicate is introduced and, after the formation of the lead silicate, the byproducts, i.e., the excess lead salt and the alkali metal salt, are separated and the liquor of reaction, or wa water containing these salts, is recycled.

The salt of the substitution metal, Me, must be introduced such that the formation of silica is avoided. This is conveniently accomplished by first forming a bottom layer with the lead salt, followed by the addition of the silicate and, optionally of a salt of lead so as to avoid having an excess of lead salt in the reaction medium. Filtration is then carried out and the liquors or the wash waters containing the excess lead salt and the alkali metal salt in solution, are recycled.

The maximum amount of the excess of lead salt is determined by the saturation limits of the solution, but it is advantageous to reduce this excess if contamination of the final product with the precipitated lead salt is to be prevented.

The salt of the substitution metal, preferably a lead salt, is either a soluble organic salt, such as the acetate, or a mineral acid salt; advantageously lead nitrate is utilized. The lead nitrate may be prepared by the action of nitric acid on lead or it may be obtained by double decomposition.

In the case of the action of the nitric acid on the lead, the recycling of the liquors or the wash waters originating from the preparation of the lead silicate may advantageously be effected at this stage, i.e., at the point of reaction of the nitric acid with the lead. It too is assumed that the addition of potassium nitrate would favor the reaction of the nitric acid with the lead.

The silicate is preferably selected from the group comprising sodium, potassium and quaternary ammonium silicates and has a high molar ratio of silica to oxide (hereinafter, simply the "molar ratio") equal to that of the lead silicate desired to be prepared.

Also according to the invention, a double silicate of sodium and potassium may be employed.

And consistent with this invention, the concentrations of the reagents is limited only by the saturation of the medium therewith, at any given temperature.

The reaction giving rise to the formation of the lead silicate may conveniently be conducted at ambient temperature. In the case where the liquors are recycled, however, it is advantageous to utilize higher temperatures in order to stabilize the salt concentration of the liquors or wash waters during the precipitation of the lead silicate.

The product obtained after the separation of the liquors or wash waters, is simply washed with water and is then dried, for example, in an oven at 110° C.

The resultant product according to the invention can be said to be a general substitute for the lead oxides, especially in view of its lesser toxicity, its low volatility, its limited solubility in water and its low density. It may also be utilized as a reinforcing filler for elastomeric materials, and generally as a pigment.

More importantly, though, markedly enhanced results are attained when utilizing the silicates according to the invention in vitrifiable compositions, especially those adapted for glass making.

Indeed, contrary to the typical prior art process, where the nature of the glass-forming oxide is dictated by the nature of the starting material oxide (sand or quartz in the case of silica), it will be appreciated that, consistent with the present invention, it is possible to conveniently form and control the desired network or lattice, simply by means of the initial vitrifiable composition.

According to the invention, generally speaking, the glass-forming oxide is dissolved by means of a flux, or directly, and it is therefore possible to prepare:

[i] a lithium, sodium or potassium silicate solution, or a solution of a quaternary ammonium silicate;

[ii] a boric acid solution;

[iii] a sodium aluminate solution; or

[iv] a sodium or potassium phosphate solution.

Elements such as lead, calcium, barium, magnesium, zinc, are readily precipitated either:

[i] because they are insoluble in silicate form;

[ii] because they are weakly soluble or insoluble in borate form;

[iii] because they are weakly soluble or insoluble in aluminate form; or

[iv] because they are weakly soluble or insoluble in phosphate form.

Prior to precipitation, these salts are typically placed in solution in nitric acid. From a practical point of view, this assumes that the alkaline silicates in particular have a sufficiently high molar ratio, $SiO_2/MeO$, advantageously greater than two. This technique, which consists of preparing the ingredients of the desired glass by converting same through a soluble phase, has the advantage of enabling certain purification operations, such as, inter alia:

[i] filtration or ultrafiltration;

[ii] the precipitation of impurities; and

[iii] the fixation of impurities on supports such as io exchange resins.

On the other hand, it is noted that the elements forming the glass are employed in the same form, whether they be introduced as alkaline silicates or metallic silicates, because the first serves to precipitate the second. This is true for all of the ingredients. Such phenomenon imparts to the desired composition unexpected characteristics of melting, fining and homogenization. In fact, the following are typical:

[i] accelerated melting at a lower and constant temperature;

[ii] accelerated fining at a slightly higher viscosity, thus at a lower temperature and, above all, in the absence of any fining aid; and

[iii] elimination of the homogenization phase, which is unnecessary because the glass obtained is in any event of excellent quality with respect to its appearance.

In this fashion, glass may be produced from high purity materials by operating under conditions that are entirely new during melting and fining, such materials being well suited for those industries requiring very high purity and homogeneity: for example, the optical industry, the field of fiber optics, reinforcing fibers, or special glasses for use in electronics.

Finally, the subject mode of preparation of vitrifiable mixtures affords access to novel industrial glasses. In actual fact, the compositions prepared by chemical means are combined with each other in a state very close or nearly identical to that existing in the final glass. They are in the amorphous state and, during melting, quite simply entails mere conversion into a transparent, homogeneous, continuous phase. This phenomenon is clearly demonstrated by differential thermal analysis which enables observation of thermal or chemical transformations.

Other advantages attendant the invention are: instead of requiring chemical reactions which are slow and which require elevated temperatures to combine the alkali metal carbonates with silica and the other elements, involving the risk of heterogeneity and the partial dissolution of refractories, the vitrifiable mixture is observed to melt rapidly at a stable, relatively low temperature to yield a transparent glass filled with bubbles of a regular diameter and large enough such that a simple increase in temperature affords good quality fining without the addition of a specific fining agent and in a very short period of time. The rapidity of melting and the fact that the glass need not be agitated to render it homogeneous, prevents the degradation of refractory materials. Furthermore, the temperatures required for melting and fining are much lower than those used to obtain glasses of the same composition through a conventional mixture.

The aforesaid properties, therefore, enable the industrial production of compositions which to date were not practicable because of the difficulties involved in the melting and fining of purely physical mixtures; it is now possible to purify the different components to the desired degree.

For certain glasses, the risks of devitrification are lower, because the constituent elements of the glass may be introduced in a perfectly defined molar ratio.

Finally, it too will be appreciated that the process according to the invention, based on the final molar proportions of the glass, enables novel properties to be obtained both in the molten glass, particularly rheological properties, and in the final glass. In fact, the chemical, physical, mechanical, optical and electrical properties likely are related to this molar ratio.

It is also within the scope of the invention to include in the subject compositions various additives in the form of silicates, such as ferrous silicates, ferric silicates, cobalt silicates, nickel silicates, copper silicates, or silicates comprising yet other oxides, e.g., selenium oxide, or the oxides of the rare earths.

It has also been noted that in the case of the vitrifiable mixture according to the invention, very dense spheres may be obtained, which facilitates their melting with a vacuum mixer.

In addition, the action of hydrofluoric acid on a glass obtained from such a mixture itself demonstrates the high degree of homogeneity of the glass-forming system. It was observed that the acid action on the silica occurs in a regular manner over the entire surface; this is confirmed by microscopic examination.

It was also observed that the resultant glass was essentially unaffected by the action of a 4% acetic acid solution at ambient temperature.

Also, optical examination in the presence of a liquid having an index of refraction equal to that of the glass indicates the absence of optical defects.

In order to further illustrate the present invention and the advantages thereof, the following specific examples are given, it being understood that same are intended only as illustrative and in nowise limitative.

EXAMPLE 1

In a 2000 cm$^3$ reactor, 155 g of lead nitrate were dissolved in 845 g of water. Under agitation, at 20° C., 400 g potassium silicate having a ratio by weight of 2.3 (or a molar ratio of 3.8) were added, dropwise, the silicate having a density of 1.27. The reaction was permitted to continue, under agitation, for 10 minutes. The suspension was next filtered and centrifuged. A raw precipitate having a moisture content of 50%, weighing approximately 440 g, was collected; the liquor remaining after precipitation weighed 960 g.

Next, the raw precipitate was dried at 110° C. for 24 hours; 220 g of a crude product consisting of lead silicate and potassium nitrate were recovered. The liquor was recycled for use in a new precipitation. At this stage, the product density was 1.06.

The 960 g of liquor were reused, with 40 g water being added thereto to bring the total amount up to 1000 g; 124 g of lead nitrate were dissolved therein and 400 g potassium silicate added thereto under the same conditions as above. After filtration and centrifugation, the raw precipitate was dried and mixed with the first obtained precipitate and the recycled liquor for yet another reaction sequence.

After at least 5 recycles, a very highly stable mother liquor, as well as a very highly stable raw precipitate resulted.

The liquor had the following properties:
[i] density: 1.100
[ii] dry extract: 13.5%
[iii] Pb$^{++}$ content 0.8%
[iv] NO$_3^-$ content 8%
[v] K$^+$ content 4.7%

The raw precipitate displayed:
[i] ignition loss: 22.0%
[ii] SiO$_2$ content: 34.0%
[iii] Pb content, expressed as PbO: 27.0%
[iv] K content, expressed as K$_2$O: 17.0%

A first washing in hot water gives rise to a lead silicate having the following average composition:

[i] ignition loss: <5%
[ii] $SiO_2$ content: 49%
[iii] Pb content, expressed as PbO: 44%
[iv] K content, expressed as $K_2O$: 1.7%
[v] trace amounts of $NO_3$ A second hot water washing yielded pure lead silicate having the following average composition:

[i] ignition loss: 5%
[ii] silica content: 48%
[iii] PbO content: 47%

The apparent density of the final product was 0.5; its density in compacted state was 0.6 and its real density was 2.3. It was observed that the washed product was essentially isotropic and amorphous, upon examination under polarized light. The lead silicate exhibited a molar ratio equal to 3.8, identical to that of the starting material silicate.

EXAMPLE 2

The procedure outlined in Example 1 was repeated, except that 150 g of lead acetate were reacted in place of the 155 g lead nitrate.

Essentially the same product as in Example 1 was obtained.

EXAMPLE 3

In this example are illustrated the use of a sodium silicate starting material having a molar ratio equal to 4 and the use of metallic lead.

In a two liter reactor, 120 g of sodium nitrate, or 1.41 mole, and 10 g of lead nitrate were dissolved in 1000 cm$^3$ water. In this manner, 1130 g of a solution having the same composition as the liquor were obtained.

To this solution, 87 g 63% nitric acid and approximately 400 g lead, in the form of small billets, were added. The nitric acid was permitted to react under cold conditions with the metal, dissolving 90 g, or 0.0436 mole, of the lead, in nitrate form. The mixture thus prepared consisted of:

[i] 9.1% sodium nitrate;
[ii] 11.7% lead nitrate; and
[iii] 79.2% water.

Into a three liter reactor, 1307 g of the aforesaid mixture were placed, the metallic lead being left in the two liter reactor, and, dropwise, 436 g of a sodium silicate solution containing 104 g $SiO_2$, or 1.73 mole, and 27 g $Na_2O$, or 0.435 mole were added thereto.

This mixture was cooled to 20° C. and a suspension of lead silicate and sodium nitrate having the following composition was obtained:

[i] 201 g lead silicate, or 0.435 mole;
[ii] 194 g sodium nitrate, a portion of which being in insoluble state, or 2.28 moles;
[iii] 10 g lead nitrate, or 0.03 mole; and
[iv] 1338 g of water.

After filtration and centrifugation, 1130 g of liquor and 613 g of precipitate were collected.

The precipitate was washed with hot water, dried in an oven, and thusly were obtained 203 g of 97% lead silicate.

The liquor was recycled for a second operation in the two liter reactor, after the addition of:

[i] 90 g lead; and
[ii] 81 g of 63% nitric acid.

The product obtained was similar to that recovered in Examples 1 and 2; thus, in a once washed sample, the following wer determined:

[i] ignition loss of 5.5%;
[ii] $SiO_2$ content of 52.2%;
[iii] Pb content, expressed as PbO, of 40.5%; and
[iv] Na content, expressed as $Na_2O$, of 1.8%, and after a second hot water washing, a pure lead silicate having the following composition was obtained:

[i] ignition loss of 5.5%;
[ii] $SiO_2$ content of 49%; and
[iii] PbO content of 45.5%.

Furthermore, a solubility test was conducted, which consisted of taking 30 g of the sample and introducing same into 100 ml water. This aqueous formulation was maintained 12 hours under agitation, at pH=6. The Pb content in the solution was determined; it was 280 mg/l, expressed as PbO. The minor amount of lead in solution evidenced that the PbO was complexed in the form of a definite compound; thus, a separate product and not a juxtaposition of the lead oxide and silica was revealed.

EXAMPLE 4

This example is to demonstrate the resultant properties and characteristics of a product prepared according to the invention.

150 g of the lead silicate prepared as in Example 3 were utilized.

240 g potassium silicate from the liquid washing, having an Rm ratio of 3.8 and 18 g sodium hydroxide were added thereto, and a suspension of lead silicates, and of sodium, was obtained. The suspension was dried. The product was ground and screened to a particle size of between 100 and 200μ. This corresponded, in the molten phase, to a composition, in % by weight, of:

[i] $SiO_2$=56.5
[ii] PbO=25.5
[iii] $K_2$=9.3
[iv] $Na_2O$=8.7

The product was heated to 900° C. and the onset of melting was observed, while, in order to obtain such fusion with sand and lead oxides, it was necessary to operate at a temperature on the order of 1300° and 1500° C., which well demonstrated the nature of the product according to the invention and its advantages in the manufacture of glass.

EXAMPLE 5 150 g of the lead silicate prepared as in Example 3, after a double washing, were utilized; 279 g of liquid potassium silicate having an Rm of 3.8 and a density of 1.27, 80.2 g of liquid sodium silicate having an Rm of 4 and a density of 1.27, and, also, 24 g sodium hydroxide, were added thereto. A suspensio was obtained which after the reaction of the sodium hydroxide with the polysilicate ions, resulted in a very intimate admixture of the following:

[i] lead silicate;
[ii] potassium silicate; and
[iii] sodium silicate.

After drying, grinding and screening, a fraction having particle sizes between 100 and 200μ was obtained; same was composed, in molten state, of:

[i] 56.5% $SiO_2$;
[ii] 25.5% PbO;
[iii] 9.3% $K_2O$; and
[iv] 8.7% $Na_2O$.

A comparison of the product prepared according to the invention and a product having the same composition, but obtained by melting sand and lead oxides, and sodium and potassium carbonates, evidenced that at 900° C. complete fusion or melting was attained per the invention, while for the reference product a temperature of 1300° C. was required.

In a 150 cm³ platinum crucible, the aforesaid amount of glass, amounting to 267 g, was perfectly fined without the addition of modifiers, when the mixture was heated to 1150° C., while the reference glass former still contained undissolved silica at this temperature.

Finally, with respect to the glass obtained, it was found that the former was less subject to attack by a 4% acetic acid solution at ambient temperature.

On a sample of glass consisting of a plate having a thickness equal to 1 mm and a length and width of 30 cm by 4 cm, a maximum loss in the acetic acid solution of 0.013% was observed, instead of the 0.026% for the reference glass, with equilibrium being attained after 24 hours.

EXAMPLE 6

150 g of the lead silicate prepared as in Example 3 were employed. 96 g sodium silicate having a density of 1.27 and the same molar ratio as the lead silicate were added thereto. The suspension obtained was dried under vacuum and compressed to form a vitrifiable composition in the form of tablets having a diameter equal to 13 mm and a thickness equal to 4 mm. A solid having a density equal to 2 was obtained in this manner.

The composition was heated to the point of fusion at 1,460° C. A good appearance and an especially marked homogeneity of the resultant glass were observed. In actual fact, an optical examination in the presence of a liquid having the same index of refraction as the glass demonstrated this homogeneity; the piece of glass was perfectly compatible with the liquid and no optical defects were noted.

EXAMPLE 7

The starting material was sodium silicate having a molar ratio equal to 4, and lead. In a two liter reactor, in 1000 cm³ water, 120 g of sodium nitrate, or 1.41 mole, and 10 g of lead nitrate were dissolved. In this manner, 1,130 g of a solution having the same composition as the liquor were obtained. To this solution, 87 g 63% nitric acid, or 0.87 mole, and approximately 400 g lead in the form of billets were added. The nitric acid was permitted to react under cold conditions; it dissolved 90 g, or 0.435 mole, of the lead, in nitrate form.

The mixture thus prepared consisted of:
[i] 11.7% lead nitrate;
[ii] 9.1% sodium nitrate; and
[iii] 79.2% water.

In a three liter reactor, the 1,307 g of the aforesaid solution were charged; the metallic lead was maintained in the two liter reactor; the solution was heated to 80° C. and, under agitation, there were added dropwise thereto 436 g of a solution of sodium silicate containing 104 g $SiO_2$, or 1.73 mole, and 27 g $Na_2O$, or 0.435 mole.

The solution was cooled to 20° C. and a suspension of lead silicate and sodium nitrate was obtained, having the following composition:
[i] 201 g lead silicate, or 0.435 mole;
[ii] 194 g sodium nitrate, partially in insoluble state, or 2.28 moles;
[iii] 10 g lead nitrate, or 0.03 mole; and
[iv] 1338 g water.

After filtration and centrifugation, 1,130 g liquor and 613 g of precipitate were recovered, the latter having the following composition:
[i] 201 g lead silicate, or 0.435 mole;
[ii] 74 g sodium nitrate, or 0.870 mole; and
[iii] 338 g water.

This precipitate was washed with hot water, dried in an oven, and 207 g of 97% lead silicate were obtained.

The following were added to this product:
[i] 307 g liquid potassium silicate, having an Rm ratio equal to 4 and a dry extract of 35%;
[ii] 176 g liquid sodium silicate, having an Rm ratio equal to 4 and a dry extract of 30%;
[iii] 11 g sodium nitrate; and
[iv] 15.5 g anhydrous sodium carbonate.

The suspension was dried and compressed to form a vitrifiable mixture in the form of tablets having a diameter of 13 mm and a thickness of 4 mm. In this manner, a solid material having a density of 2 was obtained.

This mixture was then heated to the point of fusion in 42 min at a temperature of 1,460° C. and maintained for 2 hours at 1,280° C. prior to shaping into a glass that was homogeneous and displayed very little color, even in large thicknesses, and which displayed the following composition:
[i] $SiO_2$ = 59.6%
[ii] PbO = 25.9%
[iii] $K_2O$ = 8.1%
[iv] $Na_2O$ = 6.4%

As a comparison, a control experiment was performed by preparing a vitrifiable mixture from minium (red lead), silica sand, sodium carbonate, sodium nitrate and potassium carbonate, the same being processed to obtain a glass of the same composition as above.

Melting, fining and heat-conditioning were effected under identical conditions. The two glasses had the same properties; in particular, the density of each was 2.9564.

EXAMPLE 8

In order to obtain 1 kg of a glass having the following composition:
[i] 550 g silica;
[ii] 300 g lead oxide; and
[iii] 150 g potassium oxide;
the molar ratio of $SiO_2/(PbO + K_2O)$ was first calculated; same was Rm = 3.12.

A potassium silicate solution was prepared from vitreous silicate having a molar ratio equal to 3.12. The material was made by melting a calculated mixture of sand and potassium carbonate. The silicate solution was carefully filtered to remove metallic impurities; it was perfectly clear.

From 550 g sand, calculated as pure, and 405 g potassium carbonate, and after melting and dissolution in water, 2,755 g of a solution containing 550 g silica and 276.6 g potassium oxide were obtained.

First, 1,261.3 g of this solution were utilized to form the lead silicate, from 330 g lead oxide in a nitric acid solution, corresponding to a 10% excess of PbO; 551.8 g lead silicate were obtained in solid state, upon removal of all byproducts.

Subsequently, the aforesaid product was placed in suspension in the unused potassium silicate solution. In this manner, 551.8 g lead silicate were added to 1,493.7 g of the solution.

This suspension was malaxated and dried under vacuum at a temperature of 100° C. A dense and dry vitrifiable powder was obtained, having the compositional nature desired.

In this example, it will be appreciated that the precise compositional nature of the vitrifiable composition desired depends on the amount of the potassium silicate initially prepared due to the fact that the principle of the invention is based on the substitution of lead oxide for the alkaline oxide, and since such substitution is made on a stoichiometric basis, with the excess in Pb remaining in solution in the liquor.

Ten g of the composition prepared according to this example were placed into an approximately 50 cc platinum cup. Upon heating, the following changes in appearance were determined by differential thermal analysis:

[i] up to 750° C., the powder remained white;
[ii] at 750° C., differential thermal analysis revealed an endothermic phenomenon; the powder was completely converted into a transparent vitreous mass.

EXAMPLE 9

This Example was the same as Example 8, except that the preparation of the potassium silicate was effected via the direct action on the sand of a potassium solution in the presence of the metallic peroxide, $BaO_2$, both under pressure and at an elevated temperature. In this case, a silicate solution of very high purity was obtained, having less than 5 ppm of iron. The results obtained were the same, but the glass was further characterized by a very low iron content, less than 20 ppm, which imparts excellent optical properties.

EXAMPLE 10

In order to obtain 1 kg of a glass having the following composition:
[i] 720 g silica;
[ii] 140 g sodium oxide; and
[iii] 140 g calcium oxide;
the molar ratio of the glass being equal to 2.52, a solution of sodium silicate was prepared from a vitreous silicate having a molar ratio of 2.52.

Such preparation was effected by the melting of a calculated mixture of sand and sodium carbonate. The solution was carefully filtered to remove all metallic impurities; it was perfectly clear.

From 720 g sand, calculated as pure, and 504 g sodium carbonate, and after melting and dissolution in water, 3,380 g of a solution containing 720 g silica and 294 g sodium oxide were obtained.

First, 1,774.5 g of this solution were utilized to form calcium silicate by a process that was identical in all other respects to that of making lead silicate.

Next, from 154 g calcium oxide in nitrate form, 518 g calcium silicate were obtained in solid state.

The product was then suspended in the unused sodium silicate solution. Thus, 518 g calcium silicate were added to 1,605.5 g of solution.

The suspension was malaxated and dried under vacuum at a temperature of 100° C. A dense and dry vitrifiable powder was obtained, having the compositional nature desired.

In the Examples 7 to 10, the powder was granulated and melted at 1500° C. for two hours.

The glass obtained was subjected to the action of a 10% hydrofluoric acid solution at ambient temperature for two hours. A highly uniform attack was observed, evidencing the perfect distribution of the silica lattice in the glass.

EXAMPLE 11

In a 2,000 cm$^3$ beaker, 500 g of a 6% boric acid solution were prepared. The solution was mixed under strong agitation with 500 g of a sodium silicate solution having a molar ratio equal to 4 and a density of 1.27. The rapid formation of a gel was observed, which was then broken by means of agitation. 75 g of a 63% nitric acid were added, corresponding to 47.25 g. The mixture was agitated for 24 hours. After washing, filtering and drying at 110° C., 180 g of a solid product were recovered, having the following composition:
[i] 113.5 g $SiO_2$;
[ii] 16.9 g $B_2O_3$;
[iii] 6 g $Na_2O$; and
[iv] 43.6 g $H_2O$ (combined).

This mixture, when heated to 1,500° C., transformed very rapidly into a glass of very high quality.

EXAMPLE 12

It was desired to obtain a glass having the following composition:
[i] 70.0% $SiO_2$;
[ii] 5.0% CaO;
[iii] 3.0% MgO;
[iv] 5.0% BaO; and
[v] 17.0% $Na_2O$.

The Rm (molar ratio) of the glass was calculated.

$$Rm = \frac{SiO_2}{CaO + MgO + BaO + Na_2O} = 2.4$$

Successively, from a sodium silicate with Rm=2.4 and a density of 1.43, calcium, magnesium and barium silicates were prepared, from their most common soluble salts, e.g., in the case of barium, from barium chloride, nitrate, or sulfide. All of these components were mixed together to obtain the composition desired.

From the foregoing illustrative examples, it will be seen that the present invention offers a completely novel technique for the manufacture of vitrifiable mixtures and affords better control of the purity and the form of the oxide forming the glass lattice.

And even though the applications described in the preceding examples are directed to the manufacture of glass, the resultant lead silicate may be used in and of itself for other applications; particularly, it is an admirable substitute for other lead salts.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of glass, comprising melting, fining in the absence of any fining aid and shaping into glass a glass-forming composition comprising an amorphous $SiO_2$/MeO metallic silicate, said metal Me being selected from the group consisting of lead, calcium, barium and zinc, said silicate being essentially devoid of metallic impurities and comprising the oxides $SiO_2$ and MeO in a molar ratio $SiO_2$/MeO of greater than 2, said metallic silicate being prepared according to the method comprising reacting an aqueous solution of an alkali metal silicate with an aqueous solution of a water soluble Me salt, the alkali metal oxide comprising the alkali metal silicate substituted by an Me oxide, the molar ratio of $SiO_2$ to MeO in the reaction product corresponding to the molar ratio of $SiO_2$ to alkali metal oxide in the starting material alkali metal silicate, and recovering and drying said metallic silicate.

2. The process of claim 1 wherein Me is lead.

3. The process of claim 1 wherein Me is selected from the group consisting of calcium, barium and zinc.

4. The process of claim 1 wherein the molar ratio of $SiO_2/MeO$ is between 3 and 5.

5. The process of claim 1 wherein the metallic silicate is essentially isotropic.

6. The process of claim 1 wherein said glass-forming composition further comprises a flux.

7. The process of claim 1 wherein said glass-forming composition further comprises a glass modifier.

8. The process of claim 1 wherein said glass-forming composition further comprises an alkali metal silicate.

9. The process of claim 8 wherein said alkali metal silicate is selected from the group consisting of sodium silicate, potassium silicate and mixtures thereof.

10. The process of claim 1 wherein said glass-forming composition further comprises sodium hydroxide.

11. The process of claim 1 wherein said glass-forming composition comprises lead silicates, potassium silicate, sodium silicate, sodium nitrate, and anhydrous sodium carbonate.

12. The process of claim 1 wherein said glass-forming composition further comprises a member selected from the group consisting of ferrous silicate, ferric silicate, cobalt silicate, nickel silicate, copper silicate, selenium silicate and a rare earth silicate.

13. The process of claim 1 wherein said Me salt is employed in stoichiometric excess.

14. The process of claim 1 wherein said metallic silicate is precipitated from solution.

15. The process of claim 1 wherein said alkali metal silicate is added incrementally to the Me salt.

16. The process of claim 1 wherein said lead salt is lead nitrate.

17. The process of claim 16 wherein said lead nitrate is prepared in situ via the action of nitric acid on metallic lead.

18. The process of claim 1 wherein said oxides $SiO_2$ and MeO are present in a molar ratio $SiO_2/MeO$ of greater than 3.

* * * * *